United States Patent

Hunt

[11] Patent Number: 6,065,736
[45] Date of Patent: May 23, 2000

[54] BALL VALVE HAVING A NON-INTEGRAL UPSTREAM SEAT AND AT LEAST ONE INTEGRAL DOWNSTREAM SEAT

[76] Inventor: Kevin F. Hunt, 5904 Bingle, Houston, Tex. 77092

[21] Appl. No.: 08/739,254

[22] Filed: Oct. 15, 1996

[51] Int. Cl.$^7$ ..................................................... F16K 5/20
[52] U.S. Cl. ................ 251/315.14; 251/174; 137/246.22
[58] Field of Search .............................. 137/312, 246.22; 251/315.01, 315.1, 315.13, 315.14, 174

[56] References Cited

U.S. PATENT DOCUMENTS

| | | | |
|---|---|---|---|
| 1,331,025 | 2/1920 | Riggin | 251/315.14 X |
| 3,216,696 | 11/1965 | Cooley et al. | 251/315.14 X |
| 3,916,940 | 11/1975 | Allen | 251/315.15 X |
| 4,174,092 | 11/1979 | MacLeod | 137/246.22 X |
| 4,483,511 | 11/1984 | Kushida et al. | 251/174 |
| 4,662,394 | 5/1987 | Williams . | |
| 4,679,764 | 7/1987 | Smith et al. . | |
| 4,687,179 | 8/1987 | Smith . | |
| 4,749,002 | 6/1988 | Lembser | 137/312 X |
| 4,846,212 | 7/1989 | Scobie et al. . | |
| 4,995,416 | 2/1991 | Mieth | 137/312 X |
| 5,111,839 | 5/1992 | Schroepfer et al. | 137/312 X |
| 5,170,659 | 12/1992 | Kemp | 137/312 X |
| 5,305,986 | 4/1994 | Hunt . | |
| 5,372,352 | 12/1994 | Smith et al. . | |
| 5,385,332 | 1/1995 | Smith . | |
| 5,482,253 | 1/1996 | Klyde . | |
| 5,562,116 | 10/1996 | Henwood | 251/315.14 X |

OTHER PUBLICATIONS

Dean Chisholm, *Grove B–5 Ball Valve Sealant Evaluation*, Dec. 30, 1992, p. 1.

*Primary Examiner*—John Fox
*Attorney, Agent, or Firm*—Haynes and Boone, LLP; Tim Headley

[57] ABSTRACT

A ball valve for controlling the flow of a fluid is provided having primary and secondary annular sealing seats which are disposed in the body cavity for the purpose of providing a seal between the valve body and a first hemisphere of a ball. An annular leak detection channel is defined between the primary and secondary annular sealing seat for collecting fluid that leaks past the primary sealing seat. A purge is defined in the valve body extending from the channel to the exterior of the valve body, for establishing fluid through-flow and for draining fluid away from the secondary sealing seat that collects in the channel. A third annular sealing seat sealingly engages a second hemisphere of the ball.

12 Claims, 7 Drawing Sheets

BALL VALVE HAVING A NON-INTEGRAL UPSTREAM SEAT AND AT LEAST ONE INTEGRAL DOWNSTREAM SEAT

BACKGROUND OF THE INVENTION

This invention relates to valves and, in particular, to ball valves. The use of ball valves to start and stop the flow of fluids is well known in the art. Ball valves have an interior body cavity defined in a valve body between two concentric, annular sealing seats.

The sealing seats in conventional ball valves are fabricated from any one of a number of different materials, such as, for example, a metal, a ceramic, a carbide, a carbide-coated metal, or an elastomer, and are then inserted into the valve. The inventor of the present invention designed a ball valve having at least one of the sealing seats as an integral portion of the ball valve body.

Should a ball valve begin to leak, the amount of fluid that leaks past a valve seat may initially be insufficient to be detected, or to have any visible external effects. Nevertheless, once a valve seat begins to leak, the area of the seat over which the leakage occurs typically erodes further. The leakage rate may increase, and the fluid that leaks through the ball valve may damage downstream equipment or processes, or cause other detrimental and undesirable effects. The ball valves of the prior art provide an inadequate means of determining the condition or effectiveness of the seats at a sufficiently early stage of leakage to permit convenient and effective corrective action.

Therefore, a ball valve is needed in which leakage across a seat is minimized, and is readily detectable before downstream equipment or processes are damaged, or before other detrimental or undesirable effects occur.

SUMMARY OF THE INVENTION

A ball valve has a ball defined by a plurality of hemispheres, the ball having an opening extending through it. A first and second valve body portion join together to form a valve body defining an interior body cavity configured for rotatably receiving the ball. The valve body further defines respective first and second body passageways extending from the body cavity to the exterior of the valve body.

The ball rotates within the body cavity between a first position and a second position. Primary and secondary annular sealing seats are disposed in the body cavity. An annular channel is defined between the primary and secondary annular sealing seats. The sealing seats are in sealing engagement with a first hemisphere of the ball.

In another feature of the invention, at least one of the primary or secondary annular sealing seats is formed separately from the valve body. The primary and secondary sealing seats optionally have different surface hardnesses. The ball valve includes a purge defined in the valve body extending from the annular channel to the exterior of the valve body. A leakage monitor is disposed proximate the annular channel for detecting and monitoring leakage.

In another feature of the invention, the primary and secondary annular sealing seats are downstream of the ball. The primary and secondary annular sealing seats are integrally formed as a monolithic portion of a body portion. A third annular sealing seat is disposed in a body portion, and is in sealing engagement with a second hemisphere of the ball. The first and second hemispheres may overlap.

In another feature of the invention, the sealing seats are maintained in operational orientation with respect to a mating body portion by means of a method selected from the group of methods consisting of mechanical threading, the utilization of mechanical wedging action, the utilization of mechanical fasteners, interference fitting, press-fitting, welding, bonding, the utilization of differential hydraulic pressure and the utilization of mechanical spring pressure.

In another feature of the invention, filler material is disposed in an annular space defined between the ball, an interior surface of the valve body, and the primary and secondary annular sealing seats. The filler material is a sealant. A means is provided for injecting the sealant through the purge into the annular channel.

In another feature of the invention, the valve body further defines a third opening. A stem is coupled to and extends from the ball through the third opening for rotating the ball.

A technical advantage is gained by configuring the sealing seats such that one of either the primary or secondary annular sealing seats has a lower surface hardness than either the ball, or the other of the primary or secondary annular sealing seats. This helps eliminate sealing difficulties generally associated with redundant support of the ball.

A further technical advantage achieved with the present invention is that, by draining fluid away from either annular sealing seat, the probability that leakage will span both sealing seats is greatly reduced.

A still further technical advantage achieved with the present invention is that a technician is able to monitor the purge to make an early identification of fluid leakage and, upon such identification, to determine the severity and rate of the fluid leakage. Such information permits the repair or replacement of the ball valve to be timely planned, thus avoiding emergency shutdowns, optimizing the allocation of maintenance resources, and minimizing maintenance costs.

DESCRIPTION OF THE PREFERRED EMBODIMENT

Figure 1A:
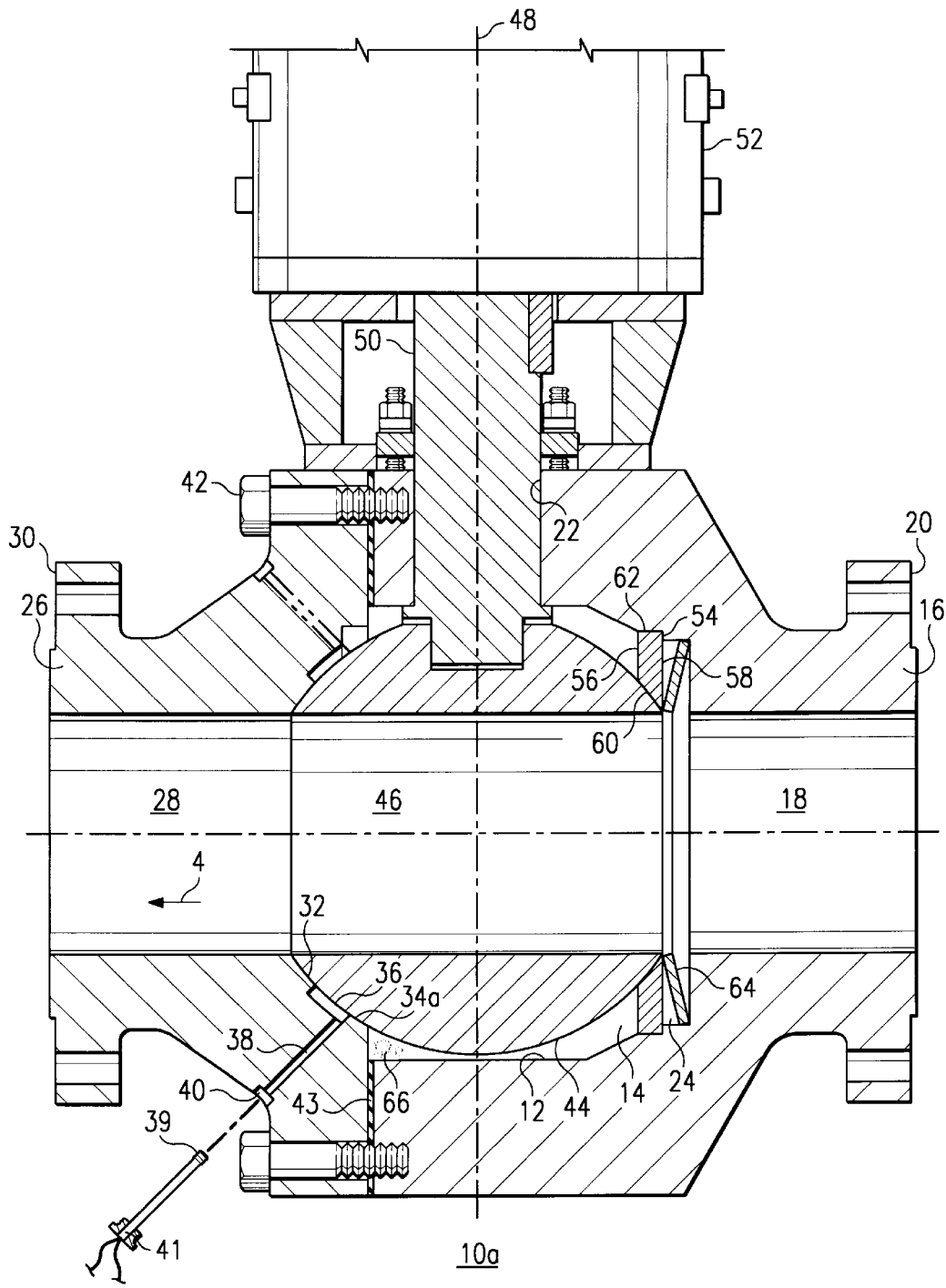
FIG. 1A is a cross-sectional, elevation view of a ball valve of the present invention.

Referring to FIG. 1A of the drawings, the preferred embodiment of a ball valve 10a of the present invention includes a valve body which has a first body portion 16, and a second body portion, or end cap 26, which secures to the first body portion with conventional fasteners, such as threaded bolts 42, and a conventional gasket 43. A ball 44 rotatably seats in an interior body cavity 12, formed between the body portion 16 and the end cap 26. The body portion 16 and the end cap 26 further define respective body and end cap passageways 18 and 28, and respective flange portions 20 and 30. The passageways 18, 28 extend from the body cavity 12 through the body portion 16 and the end cap 26, and through the flange portions 20 and 30 to the exterior of the ball valve 10a. The body portion 16, the end cap 26, and the ball 44 are fabricated from a suitable material, such as a carbon steel, a stainless steel, a ceramic, ceramet (name used in trade), a carbide alloy or a combination thereof. Materials which resist corrosion and erosion when exposed to the process fluids are preferred.

The ball 44 includes a cylindrical central passageway 46, which extends horizontally (as viewed in FIG. 1A) through the ball. The diameter of the ball 44 and the passageway 46 are sized so that the ball is rotatable within the cavity 12, about a vertical axis 48. In a fully open position, as shown in FIG. 1A, the passageway 46 aligns with the passageways 18 and 28. The ball 44 is rotatable 90° about the vertical axis 48, from the fully open position to a fully closed position (not shown), in which the passageway 46 is not aligned with the passageways 18 and 28, and the flow of fluid through the ball valve 10a is blocked.

A stem 50 couples to the ball 44, and extends upwardly (as viewed in FIG. 1A) through an opening 22 formed in the body portion 16 to a conventional actuator 52. The actuator 52 can be an electric, hydraulic, pneumatic, manual, or combination drive for imparting to the ball 44 rotary motion about the vertical axis 48, and to open and close the ball valve 10a.

An annular single seat 54 is positioned in the body cavity 12 between the ball 44 and the body portion 16, proximate the body passageway 18. Flat inner and outer faces 56 and 58, respectively, a curved inner surface 60 (provided for matingly engaging the ball 44), and a cylindrical outer surface 62 (sized for seating in the body portion 16), define the seat 54. The seat 54 is fabricated from a conventional sealing seat material such as, for example, a metal, a ceramic, a carbide, a carbide-coated metal, or an elastomer. An annular cylindrical space 24 is formed between the outer face 58 of the single seat 54 and the body portion 16. An annular spring 64, such as a conventional "BELLEVILLE" spring (also known generically as a conical or disk spring), is positioned in the space 24 for urging the single seat 54 against the ball 44.

Opposing the seat 54 and engaging the ball 44 are dual, i.e., primary and secondary, seats 32 and 34a, respectively, formed as spaced, annular raised portions of the end cap 26. These primary and secondary seats 32 and 34a precisely and sealingly engage the ball 44, proximate the end cap passageway 28. Precise engagement is obtained during manufacturing of the ball valve 10a by lapping the ball 44 into the end cap 26.

In the cavity 12, the ball 44, the body portion 16, the end cap 26, the seat 34a, and the seat 54 define an annular cavity 14. A recessed annular containment reservoir, or channel 36 is formed in the end cap 26, between the raised integral seats 32 and 34a. A purge, or bleed port 38, is formed in the end cap 26, and extends from the interior of the channel 36 to an opening 40, formed on the exterior surface of the end cap 26, for providing fluid through-flow. A plug 41 inserts into the opening 40, in order to block fluid flow. A fluid flow line, not shown, is connectable to the opening 40 for directing the flow of fluid to an environmentally safe container, or to auxiliary equipment, adaptable to perform any of a number of different functions, such as, for example, monitoring fluid that collects in the channel 36 and drains through the purge 38, or injecting sealant through the purge 38 into the channel 36 to curtail further leakage.

In operation, in a certain range of intermediate positions of the ball 44, between fully open or fully closed, the channel 36 is exposed to the fluid flowing through the ball valve 10a. The plug 41 prevents fluid from continuously leaking out of the purge 38 while the ball 44 is in the range of intermediate positions. The plug 41 is fitted with a one-way orifice, thus permitting fluid inflow (for injecting sealant) while preventing fluid out-flow. In addition, the plug 41 indicates when the fluid pressure in the channel 36 is low enough to permit safe drainage of the fluid through the purge 38.

Whether the ball valve 10a is open or closed, if there is pressurized fluid in the respective body passageway 18 or the end cap passageway 28, the ball valve is susceptible to the leakage of fluid through the seat 54 and the seats 32 and 34a. If fluid leaks past either seat 32 or 34a, then the fluid enters and collects in the channel 36.

If the purge 38 is not blocked with the plug 41, then the fluid drains out of the channel 36. If fluid drains out of the channel 36 faster than it enters, then pressure does not build up in the annular cavity 14, and fluid leakage spanning both the primary and secondary sealing seats 32 and 34a is prevented. If fluid collects in the channel 36 faster than it drains out, then the fluid accumulates in the channel. After the channel fills with the fluid, the pressure of the fluid builds up. The plug 41 includes an electronic leakage monitor 39 installed at the interior end of the plug 41 (e.g. a pressure or flow sensor), which senses the fluid pressure build-up in the channel, thus providing for early detection of leakage. A variety of other techniques are suitable for monitoring leakage without the use of the plug 41, such as, for example, periodic visual inspections of the purge 38.

The leakage monitor 39 monitors the purge 38 in order to determine the rate of fluid leakage past the sealing seat 32 or 34a. If there is no indication that fluid leakage is extensive, then the maintenance engineer chooses from a variety of optional remedial actions, such as, for example, injecting a sealant into the channel 36 through the purge 38 to inhibit further leakage. Such action provides the maintenance engineer additional time in which to replace or to more permanently repair the ball valve 10a.

The present invention has many advantages. First, corrosive fluid that leaks past one of the seats 32 or 34a collects in the channel 36, and, when the plug 41 is not inserted, drains through the purge 38. The fluid is thus prevented, or at a minimum, delayed, from damaging the other of the seats 32 and 34a.

A second advantage is that the leakage monitor 39 monitors fluid that collects in the channel 36, and, accordingly, detects a leak and determines the severity, or rate, of a detected leak. As a result, valve repair or replacement can be planned in a timely manner, emergency shutdowns can be avoided, the allocation of maintenance resources can be optimized, and maintenance costs can be minimized.

A third advantage is that the purge 38 or the plug 41 is utilized as an inlet for injecting sealant into the channel 36, thus hindering or preventing a leak from progressing through the ball valve 10a. A tight shut-off is essential in situations in which de-watering is likely to occur, such as when leakage occurs in an isolation valve which blocks the flow of a high-solid-content process fluid. Much as in the case of a common household sieve, the particulate in the process fluid remains but the water is forced out across a single seat in the prior art valves, through narrow leakage paths. If enough water leaks out when the valve is shut, then the high-solid-content process fluid may begin to harden, thus clogging the valve and the pipeline.

However, the dual integral seats 32 and 34a of the present invention minimize this likelihood by presenting yet another sealing interface to stop the de-watering. In addition, a sealant may be injected into the purge 38 and hence into the channel 36, thus forming a watertight seal which also stops the de-watering.

A fourth advantage is that the ball 44 and the primary sealing seat 32 have a greater surface hardness than the secondary sealing seat 34a. Thus the ball 44 and the primary sealing seat 32 form a master mating pair, and the secondary sealing seat 34a is a slave, conforming to the orientation of the master mating pair. Thus, the relative orientation of the ball 44 and the primary sealing seat 32 is maintained, despite any initial nonconforming orientation of the secondary sealing seat 34a. In an alternate embodiment, the ball 44 and the seat 34a have a greater surface hardness than the seat 32. In still another alternate embodiment, the ball 44 and the seat 34a have the same surface hardness as the seat 32.

Differential hardness between two surfaces on the same structure, such as the end cap 26, is obtained through the use of any number of metallurgical processes which permit localized surface treatment. For example, localized carburizing, "TUFRAM" treatment (from American Magnaplate; Arlington, Tex.), carbide-coating, or Titanium Nitriding may be used. In such cases, improved sealing of the primary and secondary sealing seats 32 and 34a onto the ball 44 results as the ball, the primary sealing seat, and the secondary sealing seat wear into a more precise mating relationship. This is the case as well when the ball 44 is ground and lapped into engagement with the primary and secondary sealing seats 32 and 34a during the assembly process.

Several variations may be made in the foregoing without departing from the scope of the invention. For example, in another feature of the invention, a cavity filler 66 is packed into the annular cavity 14. In addition, the cavity filler 66 may be of the type which is machined to fit, or which solidifies after a period of drying or curing. The cavity filler 66 may be comprised of a material, such as glass filled "TEFLON"® (polytetraflouroethylene), or glass flake, which does not break down when subjected to the process environment, and prevents filling of the cavity 14 by the process. The filled cavity reduces turbulence, and thus reduces wear.

Further variations in the foregoing are shown in FIGS. 1B, 2, 3, 4, and 5, which depict the details of ball valves 10b, 210, 310, 410, and 510, respectively, according to alternate embodiments of the present invention. Because the ball valves 10b, 210, 310, 410, and 510 contain many components that are identical to those of the previous embodiment, these same components are referred to by the same reference numerals, and thus are not described in any further detail.

Figure 1B:
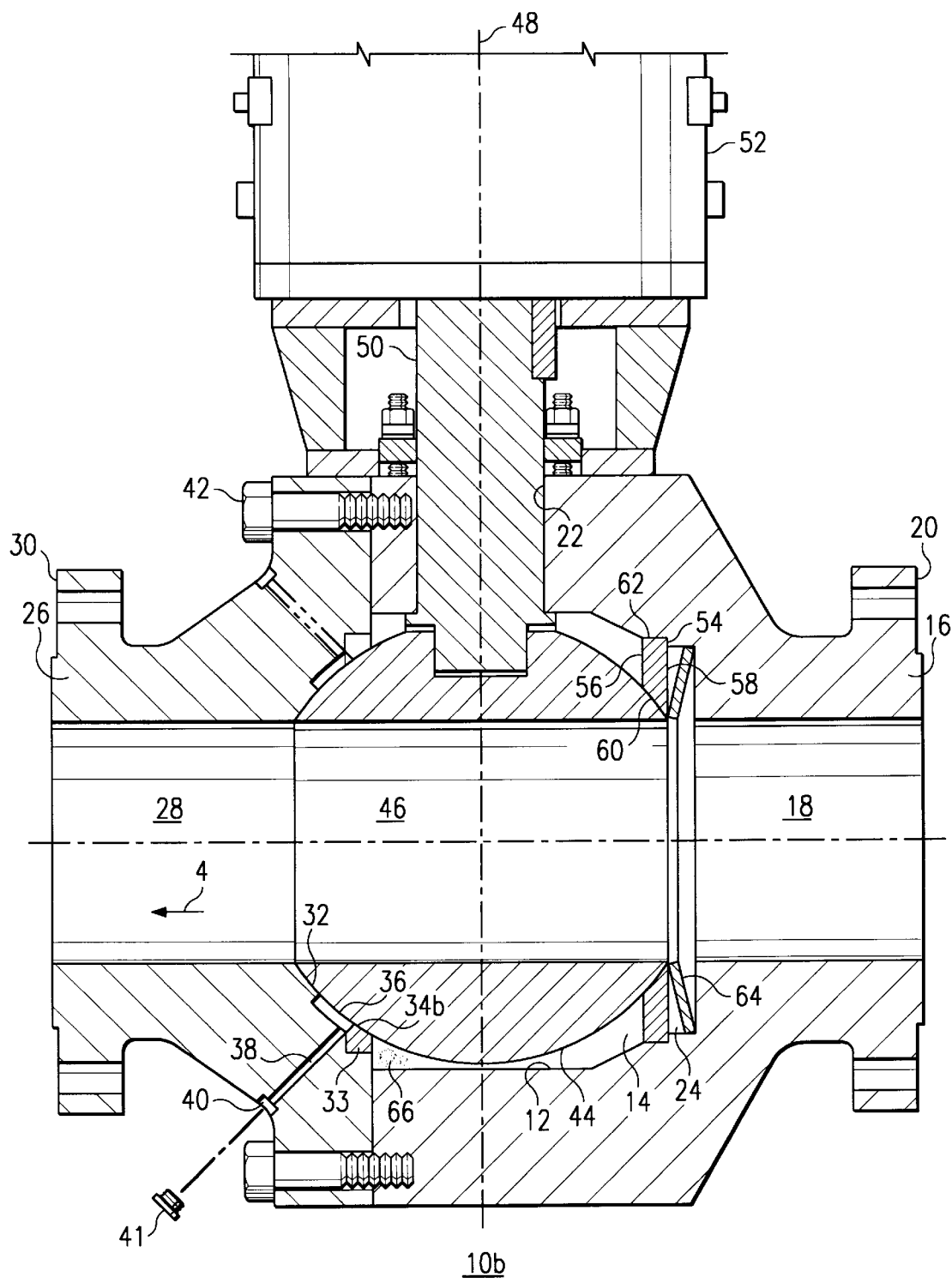
FIG. 1B is a cross-sectional, elevation view of a first alternate embodiment of the ball valve of the present invention.

Referring now to FIG. 1B, the reference numeral 10b refers, in general, to an alternate embodiment of a ball valve of the present invention. Like the ball valve 10a, a ball valve 10b includes a second body portion, or end cap 26. However, unlike ball valve 10a, the ball valve 10b utilizes a secondary sealing seat 34b which is separate from the end cap 26. The secondary sealing seat 34b is made from an elastomeric material which is substantially softer than the material from which the primary sealing seat 32 is made. The secondary sealing seat 34b provides limited and generally redundant support of the ball 44.

Figure 2:
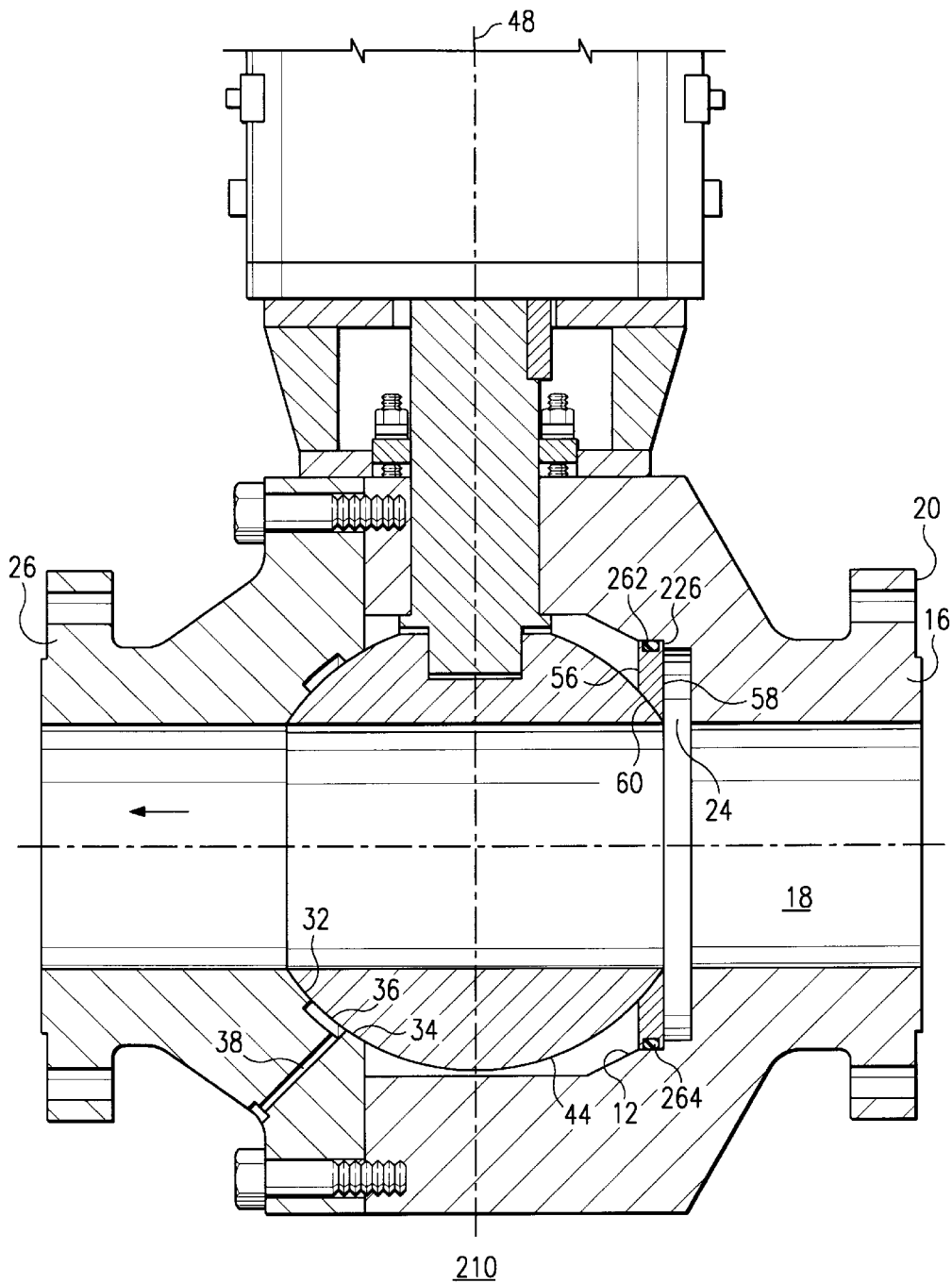
FIG. 2 is a cross-sectional, elevation view of a second alternate embodiment of the ball valve of the present invention.

Referring now to FIG. 2, a ball valve 210 has an annular seat 226 positioned in the cavity 12 between the ball 44 and the body portion 16, proximate the body passageway 18. An annular groove is formed in an outer surface 262 of the seat 226, for receiving an O-ring 264, to effect a seal between the body portion 16 and the seat 226. Pressurized fluid in the body passageway 18 enters the cylindrical space 24, and acts on the outer face 58. The force of pressure acting against the outer face 58 biases the seat 226 against the ball 44.

Operation of the ball valve 210 is virtually identical to that of the ball valve 10a, except that fluid hydraulic pressure instead of the spring 64 biases the ball 44 into the dual (i.e. primary and secondary) sealing seats 32 and 34.

Figure 3:
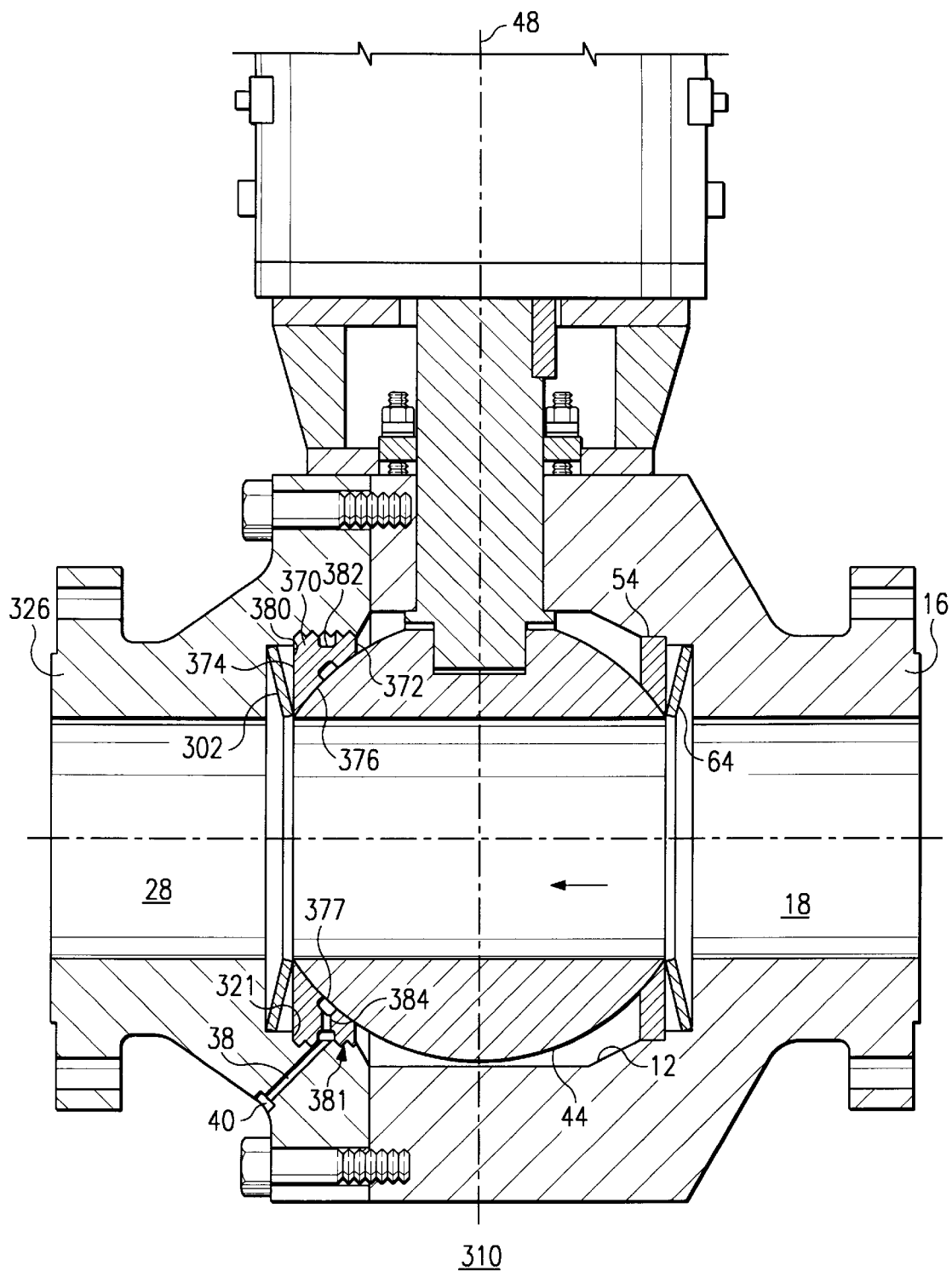
FIG. 3 is a cross-sectional, elevation view of a third alternate embodiment of the ball valve of the present invention.

Referring now to FIG. 3, a ball valve 310 includes an end cap 326, which is configured for receiving a dual sealing seat 370, which is not integral to the end cap, and a "BELLEVILLE" spring 302, for urging the dual sealing seat 370 against the ball 44. The spring 64 is stiffer, that is, it has a higher spring rate, than the spring 302.

Like the seat 54, the dual sealing seat 370 has a flat inner face 372, an outer face 374, a spherical inner surface 376 (for matingly engaging the ball 44), and a cylindrical outer surface 380. Threads 381 on the seat 370 engage mating threads on the end cap 326. The dual sealing seat 370 is fabricated from conventional seat materials, such as, for example, a metal, a ceramic, a carbide, a carbide-coated metal, or an elastomer. Unlike the seat 54, however, the faces 372 and 374 are spaced further apart, and inner and outer annular grooves 377 and 382 are formed in the respective inner and outer surfaces 376 and 380. Five spaced radial holes 384 (only one of which is shown) are formed in the dual sealing seat 370, for providing fluid flow between the annular grooves 377 and 382. Regardless of the angular orientation of the radial holes 384 about a longitudinal axis passing horizontally (as viewed in FIG. 3) through the center of the ball 44, a fluid flow path is maintained between the purge 38 and the inner annular groove 377.

Operation of the ball valve 310 is similar to the operation of the ball valve 10a. However, because the spring 64 is stronger than the spring 302, the spring 64 presses the ball 44 against the dual sealing seat 370, which in turn presses against the shoulder 321.

Figure 4:
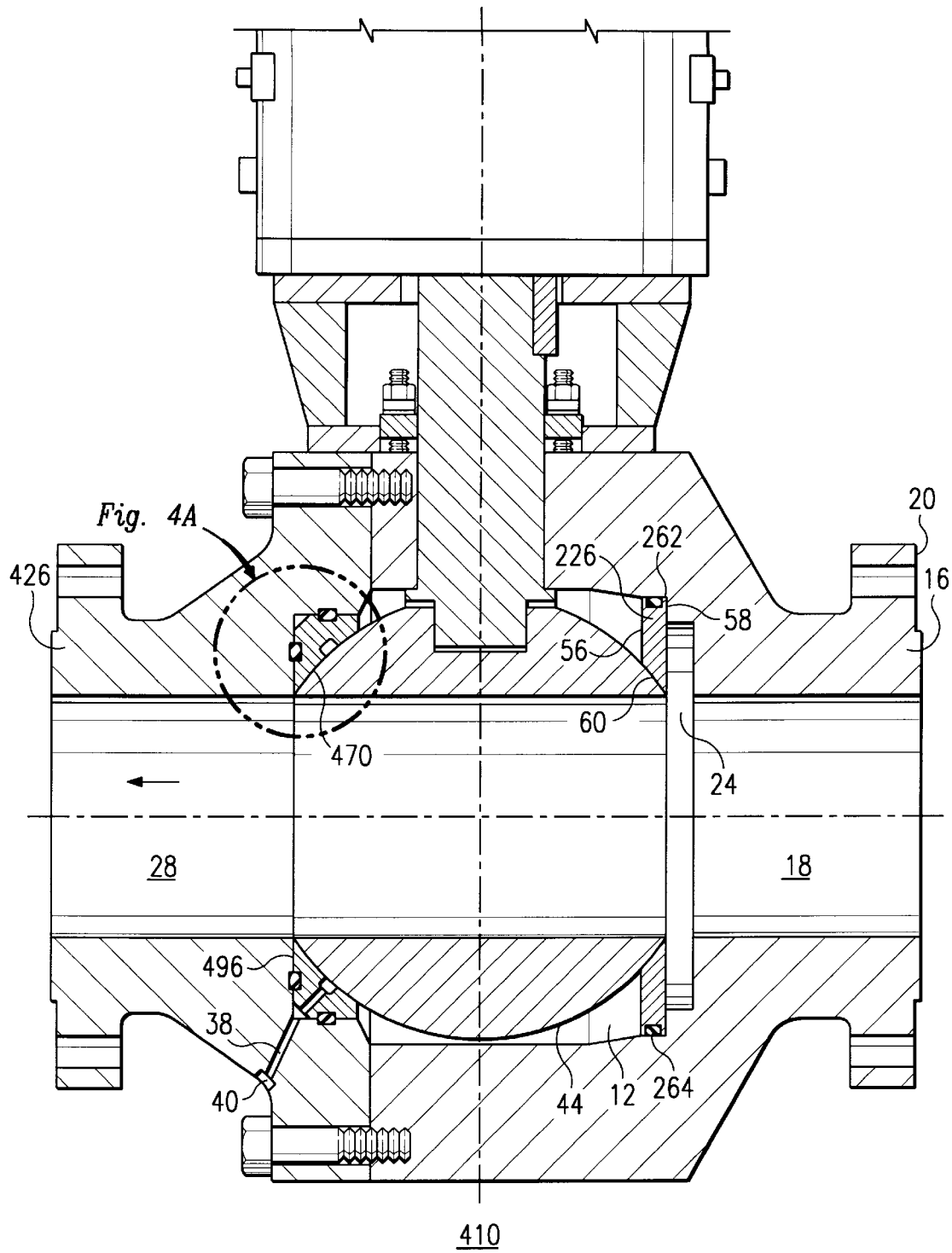
FIG. 4 is a cross-sectional, elevation view of a fourth alternate embodiment of the ball valve of the present invention.
Figure 4A:
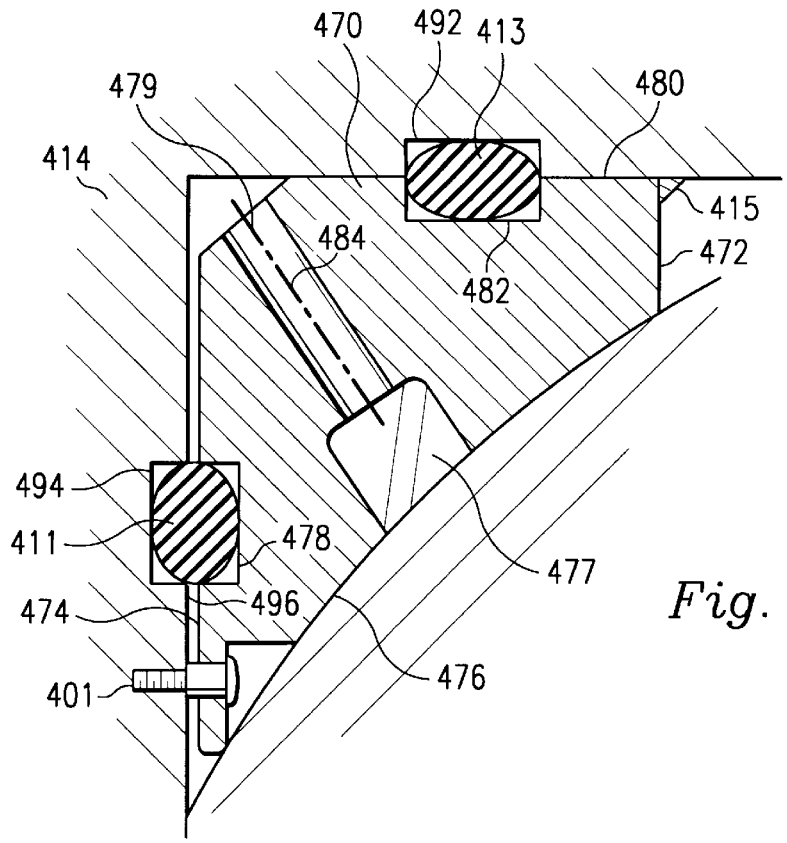
FIG. 4A is an enlarged cross-sectional view of the region 4A of FIG. 4.

Referring to FIG. 4, a ball valve 410 has an end cap 426 which is configured for receiving a dual sealing seat 470, shown in detail in FIG. 4A. Referring to FIG. 4A, the dual sealing seat 470 has flat inner and outer faces 472 and 474, respectively, a spherical inner surface 476 (for matingly engaging the ball 44), and a cylindrical outer surface 480. The outer face 474 and outer surface 480 are configured to seat within the end cap 426. A shoulder bolt 401 presses the outer face 474 against a shoulder 496 of the end cap 426. An inner annular groove 477 is formed in the inner surface 476, and an outer annular groove 479 is formed at the intersection of the outer face 474 and the outer surface 480. Five spaced radial holes 484 (only two of which are shown in FIG. 4) are formed in the dual sealing seat 470 for the purpose of providing fluid flow between the inner and outer annular grooves 477 and 479. The purge 38 extends through the end cap for providing fluid flow, or sealant injection, between the opening 40 and the outer annular groove 479.

A groove 482 in the outer surface 480, a groove 478 in the outer face 474, and corresponding grooves 492 and 494 in the end cap 426, receive two O-ring gaskets 411 and 413.

When the body portion 16 is coupled to the end cap 426, this assembly compresses the seats 226 and 470, as well as the gasket 411. This compression creates a stronger seal between the ball 44, the body portion 16, and the end cap 426.

Referring to both FIG. 4 and FIG. 4A, the groove 478 is positioned on the outer face 474 so that the surface area of the outer face 474 between the groove 478 and the spherical inner surface 476 is less than the surface area of the outer face 58 of the seat 226 that is exposed to pressure from fluid in the body passageway 18. Thus, differential hydraulic pressure presses the ball 44 against the dual sealing seat 470, and the seat 470 against the shoulder 496. Both the seat 226 and the dual sealing seat 470 are fabricated from conventional seat materials, such as, for example, a metal, a ceramic, a carbide, a carbide-coated metal, or an elastomer.

The ball valve 410 operates similarly to the ball valves 210 and 310. If fluid pressure in the body passageway 18 is equal to the fluid pressure in the end cap passageway 28, then the fluid pressure creates a net force which biases the ball 44 against the dual sealing seat 470, and thus the seat 470 presses against the shoulder 496 in the end cap 426.

Figure 5A:
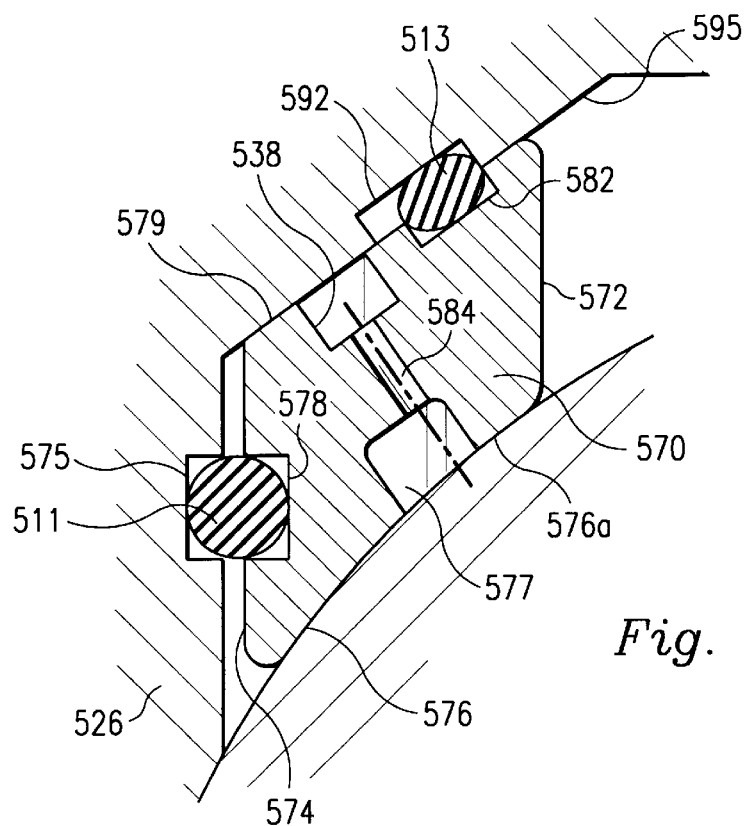
FIG. 5A is an enlarged cross-sectional view of the region 5A of FIG. 5.
Figure 5:
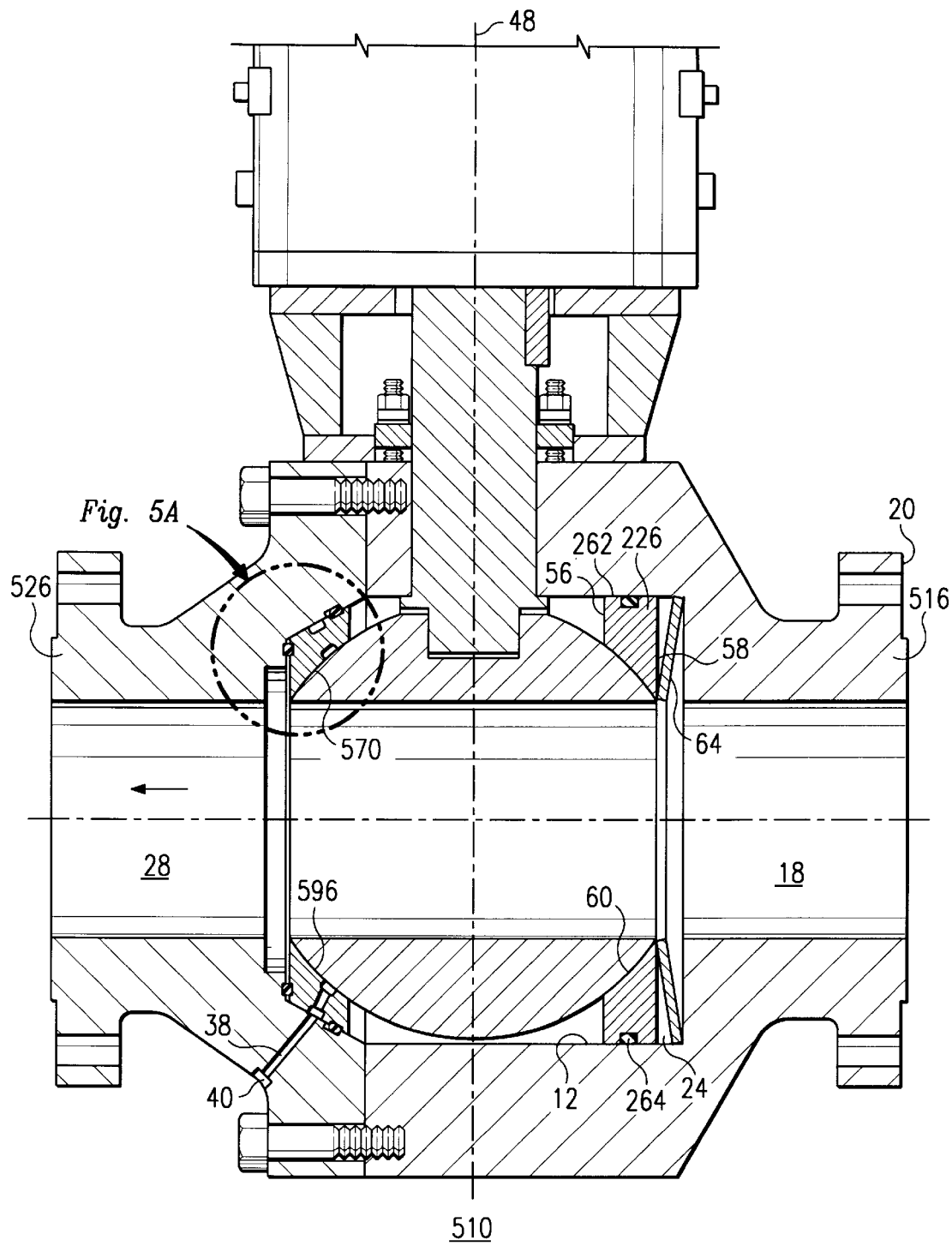
FIG. 5 is a cross-sectional, elevation view of a fifth alternate embodiment of the ball valve of the present invention.

Referring to FIG. 5, a ball valve 510 includes an end cap 526, which has a dual sealing seat 570, shown in detail in FIG. 6A. Referring to FIG. 5A, the dual sealing seat 570 has flat inner and outer faces 572 and 574, respectively, spherical inner surfaces 576 and 576a (for matingly engaging the ball 44) and a conical outer surface 579. The outer face 574 and outer surface 579 are configured to wedgingly engage within the end cap 526. An inner annular groove 577 is formed between the inner surfaces 576 and 576a, and an outer annular groove 538 is formed in the surface 579. Five spaced radial holes 584 (only two of which are shown in FIG. 5) are formed in the dual sealing seat 570. The radial holes 584 provide for fluid flow between the inner and outer annular grooves 577 and 538. The purge 38 extends through the end cap for providing fluid flow, or sealant injection, between the opening 40 and the outer annular groove 538.

Two grooves 578 and 582 are formed on the respective outer face 574 and the outer surface 579, and corresponding grooves 575 and 592 are formed in the end cap 526, for receiving two O-ring gaskets 511 and 513.

Referring to both FIG. 5 and FIG. 5A, the groove 578 is positioned on the outer face 574 so that the surface area of the outer face 574 between the groove 578 and the spherical inner surface 576 is less than the surface area of the outer face 58 of the seat 226 that is exposed to pressure from fluid in the body passageway 18. Thus, differential hydraulic pressure presses the ball 44 against the dual sealing seat 570, and the seat 570 against a shoulder 596 of the end cap 526. In addition, the "BELLEVILLE" spring 64 biases the ball 44 against the dual sealing seat 570, and the seat 570 against the shoulder 596. When the body portion 16 couples to the end cap 526, the seats 570 and 226, as well as the gaskets 511, 513, and 264 are compressed.

Both the seat 226 and the dual sealing seat 570 are fabricated from conventional seat materials such as, for example, a metal, a ceramic, a carbide, a carbide-coated metal, or an elastomer. As with the valve 310, regardless of the angular orientation of the radial holes 584 about a longitudinal axis passing horizontally (as viewed in FIG. 5) through the center of the ball 44, a fluid flow path is maintained between the purge 38 and the inner annular groove 577.

Operation of the ball valve 510 is a composite of the operations of ball valves 310 and 410, with the additional feature that a wedging effect is created by the interface of the outer conical surface 579 with a conical surface 595 of the end cap 526, which improves the seal created by the gaskets 511 and 513.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

For example, the above-described variations of a dual sealing seat arrangement creating a leak detection channel are generally conducive to implementation at either or both ends of the ball 44, proximate either of the opposed passageways 28 and 18.

Alternatively, the sealing seats may be oriented and retained in the body cavity 12 using such alternative methods as mechanical threading 381 (FIG. 3), interference fitting or press-fitting 33 (FIG. 1B), welding or bonding 415 (FIG. 4A), differential hydraulic pressure (see seats 226 and 430, FIGS. 2 and 4), or mechanical fastening 401 (FIG. 4) in which retaining devices such as a retainer ring, a dowel pin, a conventional fastener or a setscrew is used.

Piping or fluid flow lines (not shown) may be coupled to the flange portions 20 and 30, though piping may also be welded to the body portion 16 or end cap 26 even when no flange portions are provided.

The first and second valve body portions 16 and 26 may be joined together such that the first and second body passageways 18 and 28, and the body cavity 12 are formed in a single body portion.

What is claimed is:

1. A ball valve comprising:
   a. a ball defined by a plurality of hemispheres, the ball having at least one opening extending through it;
   b. a valve body comprised of joined-together first and second valve body portions, the valve body defining an interior body cavity configured for rotatably receiving the ball, the valve body further defining respective first and second body passageways extending from the body cavity to the exterior of the valve body, in which the ball is rotatable within the body cavity between a first position wherein the opening in the ball is substantially aligned with the first and second body passageways, and a second position in which the opening in the ball is not substantially aligned with the first and second body passageways;
   c. first and second annular sealing seats disposed in the body cavity, downstream of the ball, and integrally formed as a monolithic portion of the first valve body portion, the first and second annular sealing seats in sealing engagement with a first hemisphere of the ball;
   d. a channel defined between the first and second annular sealing seats;
   e. a third annular sealing seat disposed in the second valve body portion, upstream of the ball, and in sealing engagement with a second hemisphere of the ball, the third annular sealing seat being a non-integral seat;
   f. the third annular sealing seat having an outer groove for receiving an O-ring; and
   g. a disk spring positioned between the third annular sealing seat and the second valve body portion, the disk spring pushing the third annular sealing seat against the ball;

wherein the ball seals against the first and second annular sealing seats at an upstream pressure as low as zero pounds of pressure, and wherein as the upstream pressure increases, the disk spring pushes the third annular sealing seat tighter against the ball.

2. The ball valve of claim 1, including a purge defined in the valve body extending from the channel to the exterior of the valve body.

3. The ball valve of claim 2 further comprising filler material disposed in an annular cavity defined between the ball, an interior surface of the valve body, the second annular sealing seat, and the third annular sealing seat.

4. The ball valve of claim 3 wherein the filler material is a sealant.

5. The ball valve of claim 1, wherein the material of the third annular sealing seat is selected from a group consisting of a metal, a ceramic, a carbide, a carbide-coated metal, or an elastomer.

6. The ball valve of claim 1, further comprising an O-ring in the outer groove.

7. A ball valve comprising:
   a. a ball defined by a plurality of hemispheres, the ball having at least one opening extending through it;
   b. a valve body comprised of joined-together first and second valve body portions, the valve body defining an interior body cavity configured for rotatably receiving the ball, the valve body further defining respective first and second body passageways extending from the body cavity to the exterior of the valve body, in which the ball is rotatable within the body cavity between a first position wherein the opening in the ball is substantially aligned with the first and second body passageways, and a second position in which the opening in the ball is not substantially aligned with the first and second body passageways;
   c. a first annular sealing seat disposed in the body cavity, downstream of the ball, and integrally formed as a monolithic portion of the first valve body portion, the first annular sealing seat in sealing engagement with a first hemisphere of the ball;
   d. a second annular sealing seat disposed in the second valve body portion, and in sealing engagement with a second hemisphere of the ball, the second annular sealing seat being a non-integral seat; and
   e. the second annular sealing seat having an outer groove for receiving an O-ring; and
   f. a disk spring positioned between the second annular sealing seat and the second valve body portion, the disk spring pushing the second annular sealing seat against the ball;

wherein the ball seals against the second annular sealing seat at an upstream pressure as low as zero pounds of pressure, and wherein as the upstream pressure increases, the disk spring pushes the second annular sealing seat tighter against the ball.

8. The ball valve of claim 7, including a purge defined in the valve body extending from the interior body cavity to the exterior of the valve body.

9. The bell valve of claim 8 further comprising filler material disposed in an annular cavity defined between the ball, an interior surface of the valve body, the first annular sealing seat, and the second annular sealing seat.

10. The ball valve of claim 9 wherein the filler material is a sealant.

11. The ball valve of claim 7, wherein the material of the second annular sealing seat is selected from a group consisting of a metal, a ceramic, a carbide, a carbide-coated metal, or an elastomer.

12. The ball valve of claim 7, further comprising an O-ring in the outer groove.

* * * * *